(12) United States Patent
Michael et al.

(10) Patent No.: US 7,193,522 B2
(45) Date of Patent: Mar. 20, 2007

(54) APPARATUS AND CIRCUIT FOR USE WITH CAPACITIVE PRESENCE DETECTION SYSTEMS

(75) Inventors: Stephen Michael, Sarasota, FL (US); Scott Tannehill, Sarasota, FL (US); Peter Leferson, St. Petersburg, FL (US)

(73) Assignee: Invisa, Inc., Sarasota, FL (US)

( * ) Notice: Subject to any disclaimer, the term of this patent is extended or adjusted under 35 U.S.C. 154(b) by 397 days.

(21) Appl. No.: 10/398,048

(22) PCT Filed: Oct. 2, 2001

(86) PCT No.: PCT/US01/42453

§ 371 (c)(1),
(2), (4) Date: Sep. 9, 2003

(87) PCT Pub. No.: WO02/29748

PCT Pub. Date: Apr. 11, 2002

(65) Prior Publication Data

US 2004/0061610 A1    Apr. 1, 2004

Related U.S. Application Data

(60) Provisional application No. 60/237,154, filed on Oct. 2, 2000.

(51) Int. Cl.
*G08B 21/00* (2006.01)

(52) U.S. Cl. ............... 340/686.1; 340/507; 340/562; 324/500

(58) Field of Classification Search ............ 340/686.1, 340/507, 562, 686.6; 342/436; 324/418, 324/500; 73/304, 862.046
See application file for complete search history.

(56) References Cited

U.S. PATENT DOCUMENTS

| | | | | |
|---|---|---|---|---|
| 4,336,461 A | * | 6/1982 | Ida ............................. | 250/551 |
| 4,346,371 A | * | 8/1982 | Ida ............................. | 340/507 |
| 4,429,264 A | * | 1/1984 | Richmond .................. | 318/466 |
| 4,573,040 A | * | 2/1986 | Maltby et al. .............. | 340/511 |
| 5,034,722 A | | 7/1991 | Premack ..................... | 340/562 |
| 5,334,970 A | | 8/1994 | Bailey ........................ | 340/506 |
| 5,337,039 A | * | 8/1994 | Simon ........................ | 340/562 |
| 5,432,498 A | | 7/1995 | Zilbershtein et al. ....... | 340/566 |
| 5,793,293 A | | 8/1998 | Melamud et al. .......... | 340/596 |

* cited by examiner

*Primary Examiner*—Toan N. Pham
(74) *Attorney, Agent, or Firm*—Gifford, Krass, Sprinkle, Anderson & Citkowski, P.C.

(57) ABSTRACT

A capacitance presence sensing apparatus (10) having a fail-safe circuit (13) and modular units (100). The fail-safe circuit (13) includes delivering a low voltage (FIG. 5) to a sensor and connecting voltage through a resistor to an oscillator (18). An opener ground in the circuit changes frequency of the oscillator (18) to indicate a problem With the fail-safe circuit (13). The apparatus also contains a number of inductance coils (28) which may be selected to tune the frequency of the system. Circuitry is provided in cards which may be combined together with receiver transmitter cards (106) and to easily facilitate the use of the system for desired applications.

3 Claims, 5 Drawing Sheets

US 7,193,522 B2

APPARATUS AND CIRCUIT FOR USE WITH CAPACITIVE PRESENCE DETECTION SYSTEMS

FIELD OF THE INVENTION

The invention relates to an apparatus and circuits for use with capacitive presence detection systems.

BACKGROUND OF THE INVENTION

Motion detection systems are known for detecting the presence of a person or vehicle to a device such as a parking gate. One type of system that utilizes the rate of change in frequency of a signal from an oscillation from a continuous wave output is disclosed in U.S. Pat. No. 5,337,039 to Simon. The system utilizes an oscillator which produces a wave in a preset frequency range which is delivered to a capacitive plate or sensor. The sensor is mounted to a device such as a parking gate. The sensor is in the form of a coaxial cable which functions as one plate of a capacitor. The cable is attached by clips to the gate. When the sensor nears conductive objects, the frequency of the preset signal changes. An error signal is generated if the rate of change in frequency exceeds a predetermined rate. The error signal is sent to a control unit which emits a signal to stop the movement of the gate.

However, presently known systems have practical limitations when placed in certain environments. Noise, environment and movement of the sensor can limit the effectiveness of the system. It is thus an object of the invention to provide a presence sensing system which may be simply and easily used in a wide range of applications.

SUMMARY OF THE INVENTION

The capacitive presence sensing equipment of the present invention includes a fail-safe circuitry which is operative to provide a warning if the sensor is broken or damaged. A voltage is looped through the sensor and connected to a frequency oscillator, a DC short in the circuit or low RF impedance path to ground results in the oscillator producing a low-frequency wave thereby generating a fail-safe signal when the frequency falls below a predetermined level. Thus, if the sensor is broken or damaged to produce a ground or short, a warning signal is triggered.

The detection system also includes improved circuitry to preload the sensor with capacitance to reduce noise disturbance. The system is also provided with a logic gate which prevents error signals from occurring when a sensor begins movement from a conductive object such a wall. Additionally, a steering diode is used to speed up a phase lock loop when the sensor is moving away from a capacitive object.

Additionally, the detection system is provided in modular components which permits the system to be installed in any number of different applications such as on parking gates, moving sliding gates, garage doors and security applications. The modular system accommodates both hardwire and radio frequency transmission of data between the components when the system is installed on moving objects. The components include an RS module, a com box, and a receiver box. The boxes accommodate different circuit boards which may be inserted to permit customizing of the system for different applications.

BRIEF DESCRIPTION OF THE DRAWINGS

Other features and advantages of the present invention will become apparent to those skilled in the arts upon reading the following description with reference to the accompanying drawings in which.

DETAILED DESCRIPTION OF THE PREFERRED EMBODIMENTS

Figure 1:
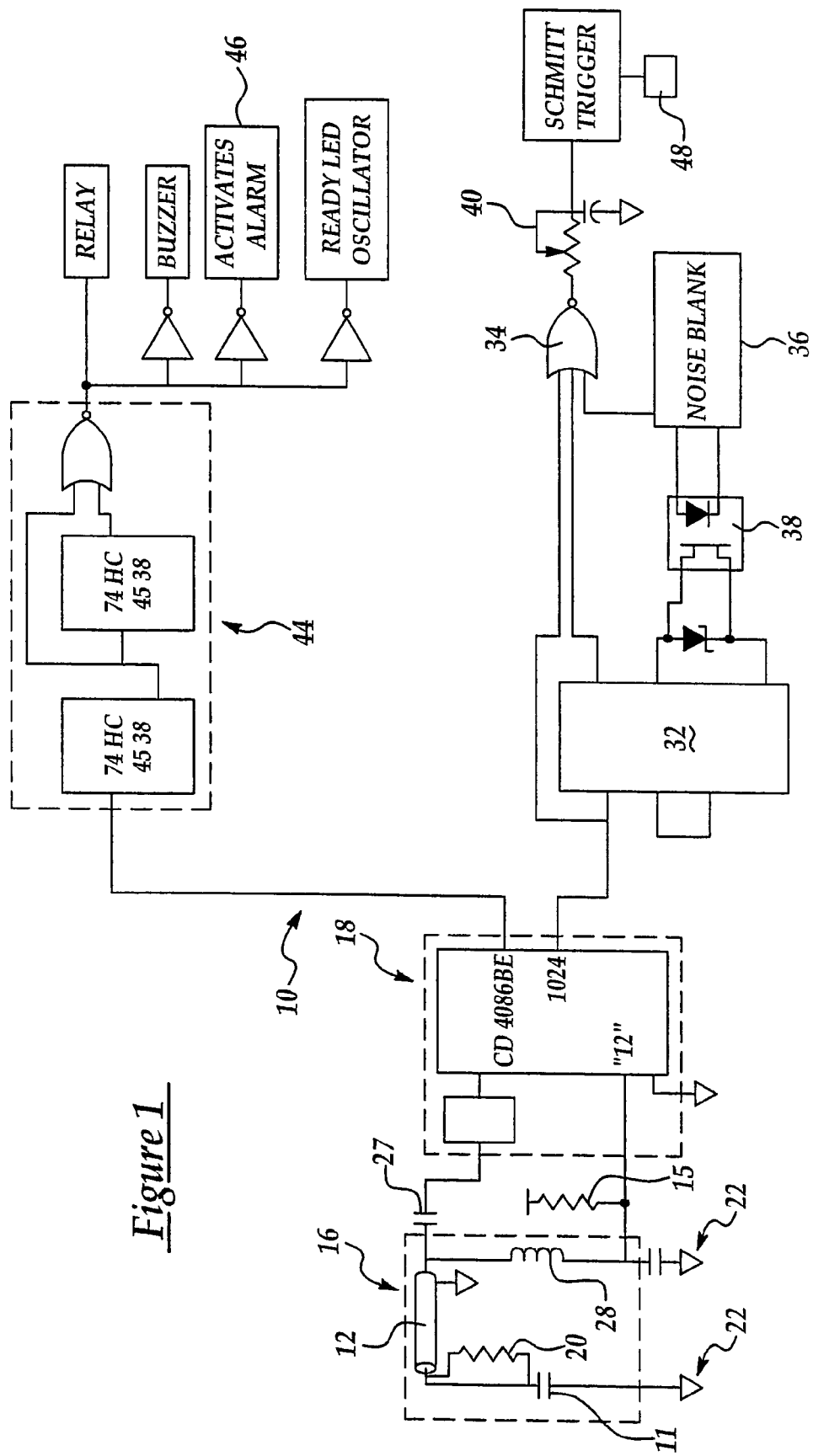
FIG. 1 is a schematic of a capacitive presence sensing device having a fail-safe circuit in accordance with the invention.
Figure 4:
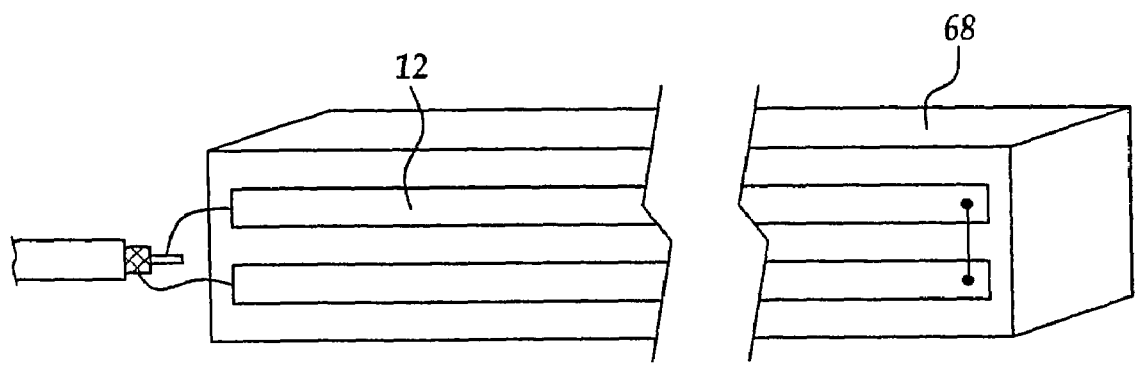
FIG. 4 is a perspective bottom view of a parking gate with a sensor installed for use with the fail-safe circuit in accordance with the invention.

As shown in FIG. 1, a capacitive presence sensing apparatus 10 having an external sensor 12. As shown in FIG. 4, the sensor 12 may be mounted on a parking gate arm 68 to detect the presence of an object such as a car or person. The apparatus 10 has an oscillator 18 which generates a preset signal which is connected to the sensor 12 to provide an electromagnetic field. When a conductive object enters the field, the frequency of the preset signal changes. An error signal is sent when the rate of change of the frequency is greater than a predetermined rate. When used in conjunction with a parking gate, the error signal is sent to a control unit to stop the movement of the gate. Although the apparatus 10 is disclosed for use with a parking gate, the apparatus 10 may be used in a wide range of applications such as garage doors, security systems, etc.

In accordance with the invention, the capacitive presence sensing apparatus 10 includes a security and integrity fail-safe circuit 44 for the sensor 12. A low voltage DC current (i.e. 12 volts) power source 15 through a 470K pull up resistor 14 is delivered to one end of the sensor 12 with the signal from an LC tank 16 connected to an a stable multi-vibrator RC such as an oscillator 18. A suitable oscillator is produced by Texas Instruments having a product number CD4060B. As shown in FIG. 4, both the DC current and pulsed signal are delivered to one end of the sensor 12 through the center wire 70 of a coaxial cable. The other end of the sensor 12 is connected through a resistor 20 such as a 47K ohm resistor to the grounded shield 72 of the coaxial cable. As shown in FIG. 1, the 47K resistor 20 completes the DC path to ground and holds the voltage terminal at pin "12" to logic low. A capacitor 27 blocks the DC while providing a low impedance path for the continuous wave signal of the LC Tank Circuit 16. If the sensor 12 is damaged, such as when a parking gate is broken, the circuit opens and no signal is produced by the oscillator 18. The resistor 14 pulls up the DC level at terminal pin "12" to logic high thus inhibiting the oscillating signal. A DC short in the circuit or low RF impedance path to ground 22 results in the oscillator 18 producing a low frequency wave. As shown in FIG. 1, the oscillator 18 is connected to a failure to detect circuit 44 which produces a fail-safe signal when the frequency falls below a predetermined frequency level. Thus an open circuit or a low impedance condition results in the frequency dropping below the frequency cut-off level, a fail-safe signal is generated to indicate a failure in the system.

As shown in FIG. 1, the presence detection system 10 also includes improved circuitry to preload the sensor with capacitance to reduce noise disturbance.

Figure 2:
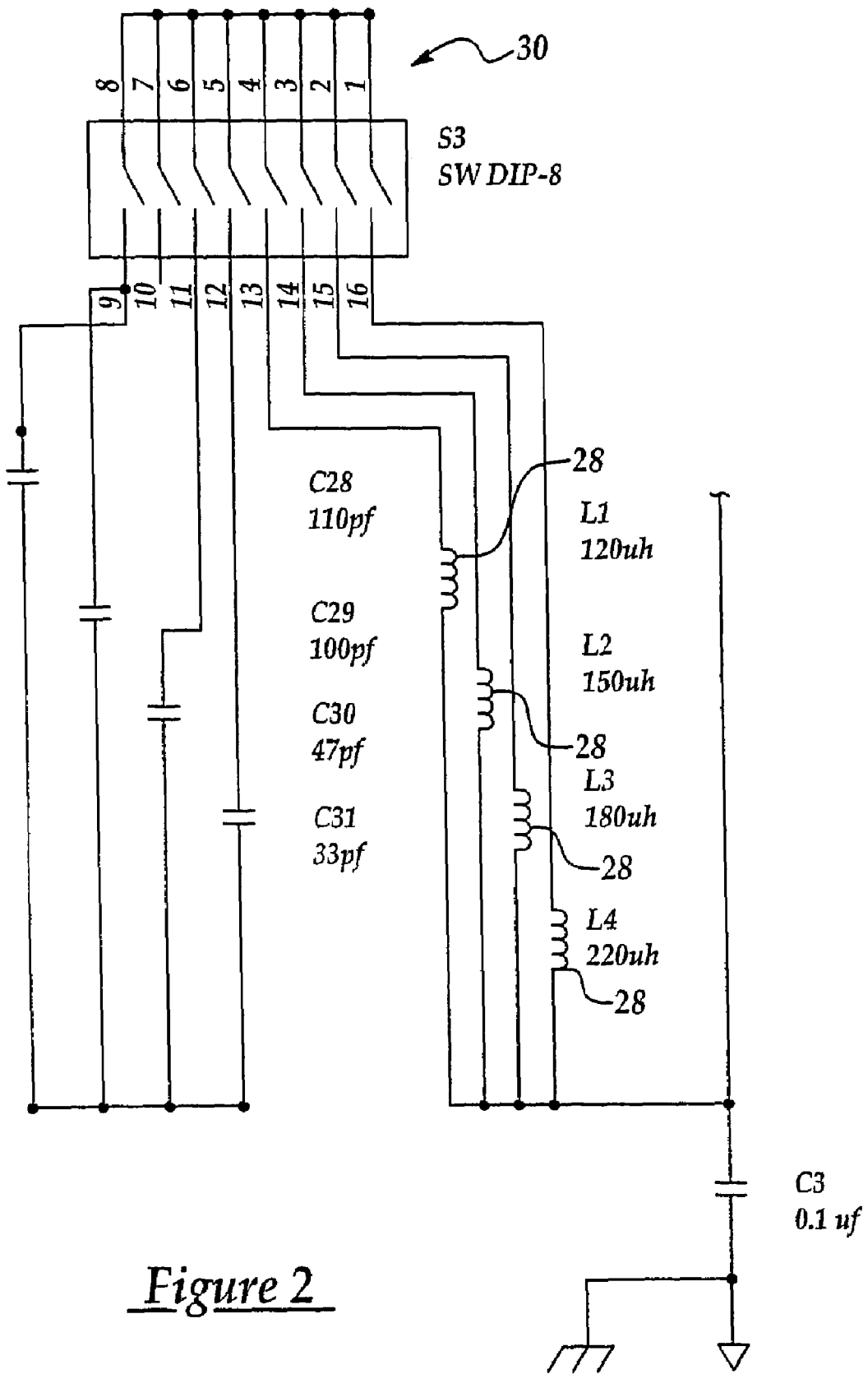
FIG. 2 is a schematic representation of a tunable LC tank circuit having a plurality of inductors and capacitors made selectable through a DIP switch.

As shown in FIGS. 1 and 2, the LC tank circuit 16 also includes a series of coils 28 having values which are used to change the value of inductance in the LC portion to adjust the frequency of the system. A set of dip switches 30 are provided to select the coil value. Different antenna sensors have different capacitance, thus a coil value can be selected to keep in the desired band. By selecting the frequency of the system, the system can also be tuned to avoid disturbance from other nearby transmitters or other electromagnetic interference (EMI).

As shown in FIG. 1, the output from the RC oscillator 18 is divided by 1024 and then passed to a phase lock loop circuit 32 (PLL) such as CD4046B made by Texas Instruments as well as one input of a three input NOR gate 34. The output of the NOR gate 34 will only go high when all three inputs are low. The output from the phase pulse pin of the phase lock loop 32 which represents a change in frequency is delivered as a second input into the NOR gate 34. The PLL 32 has a frequency which is a factor of 1024 of the operating frequency of the LC 16.

When there is a downward shift in frequency of the output signal which occurs with an increase of capacitance at the sensor 12, such as when approaching an object, the output of the NOR gate 34 is a square wave pulse which represents rate of change in only a downshift in frequency. The PLL circuit 32 also includes a steering diode 38 to speed up the PLL when there are upward shifts in frequency to reduce the rate of change in the frequency which occurs when the sensor moves away from a conductive structure such as a wall.

In applications where the sensor is static, the elimination of the steering diode and NOR gate 34 permits the system to "see" objects moving away or towards the sensor. Furthermore, by reversing the steering diode and using a comparator output from the PLL in place of the 1024 from the LC on the input of the NOR gate 34, the system will "see" only objects moving away from the sensor.

Figure 3:
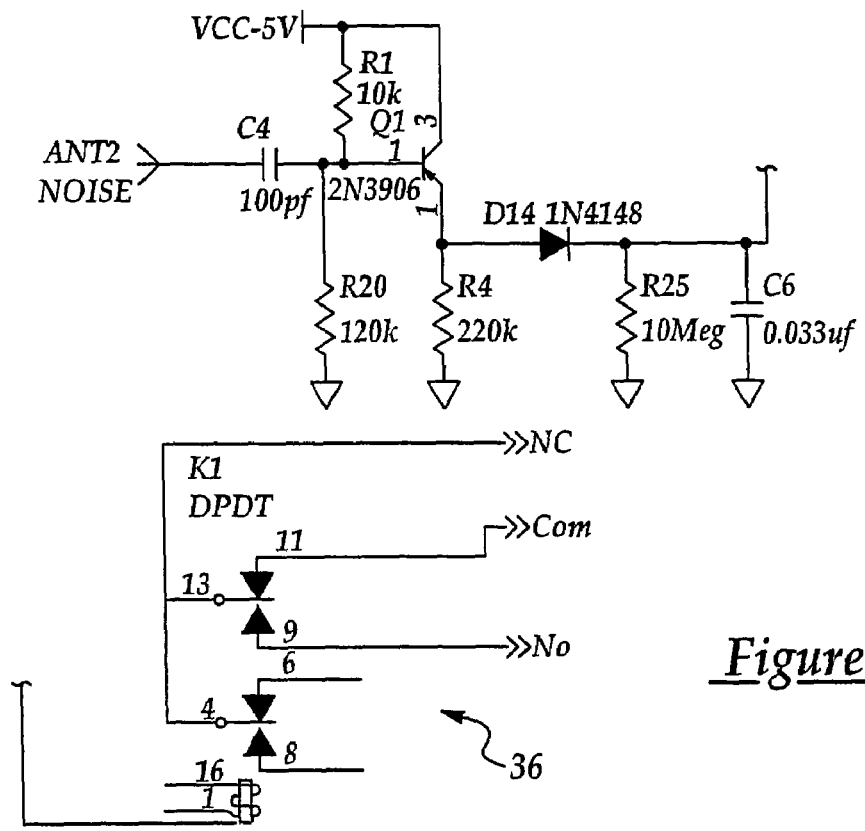
FIG. 3 is a circuit diagram in accordance with the invention.

As known in the art, the system includes a noise blank 36 that includes an EMI antenna to detect possible EMI interference. As best illustrated in FIG. 3, the output from the EMI antenna is coupled through a transistor and coupled as a third input signal to the NOR gate 34. Thus, whenever the EMI exceeds a preset threshold, the transistor turns on thus providing a high input to the NOR effectively disabling the NOR gate 34 and providing an output to energize the opticoupler circuit 38 speeding up the PLL.

After the EMI interference is removed, the transistor switches to a low output and the opticoupler remains energized for a short period, i.e. 1 –2 milliseconds to remove the residual effect of the disturbance in the PLL. An RC (not shown) is used to create this period thus providing a time delay before the PLL can produce an error signal indicating an object detected by the sensor antenna.

As known in the art, during normal operation, i.e. EMI below the threshold, the output from the NOR gate 34 is fed through a sensitivity control 40. The sensitivity control 40 comprises a series of different capacitors which are selectably electrically connected with the output from the sensitivity control. The selected capacitor in the range control charges whenever the output from the NOR gate is high in accordance with the RC time constant of the selected capacitor and sensitivity control.

The output from the sensitivity control 40 is fed as the input trigger signal to a Schmidt trigger 42. Whenever the voltage from the output of the sensitivity control as controlled by the charging capacitor in the range control exceeds a predetermined voltage threshold, the Schmidt trigger 42 is activated thus switching its output signal Q to a high state. The output signal Q turns on an FET switch 48 which in turn activates a first relay (not shown). This relay can be used, for example, to reverse the direction of travel of the automotive swing gate.

The output signal Q from the Schmidt trigger 42 also may be coupled through a latch delay circuit and ultimately coupled as an input signal to a second FET. This FET is thus activated at a predetermined time period, e.g. 6–35 seconds, after the activation of the first FET. A reset disable circuit is also coupled to selectively disable the Schmidt trigger circuit curing an initial power on condition. The reset disable circuit prevents false trigger of the FET during a power on condition.

A failure detect circuit 44 is also preferably connected to the output from the oscillator to provide an alarm 46 whenever the entire system is disabled by the fail-safe circuit.

Figure 5:
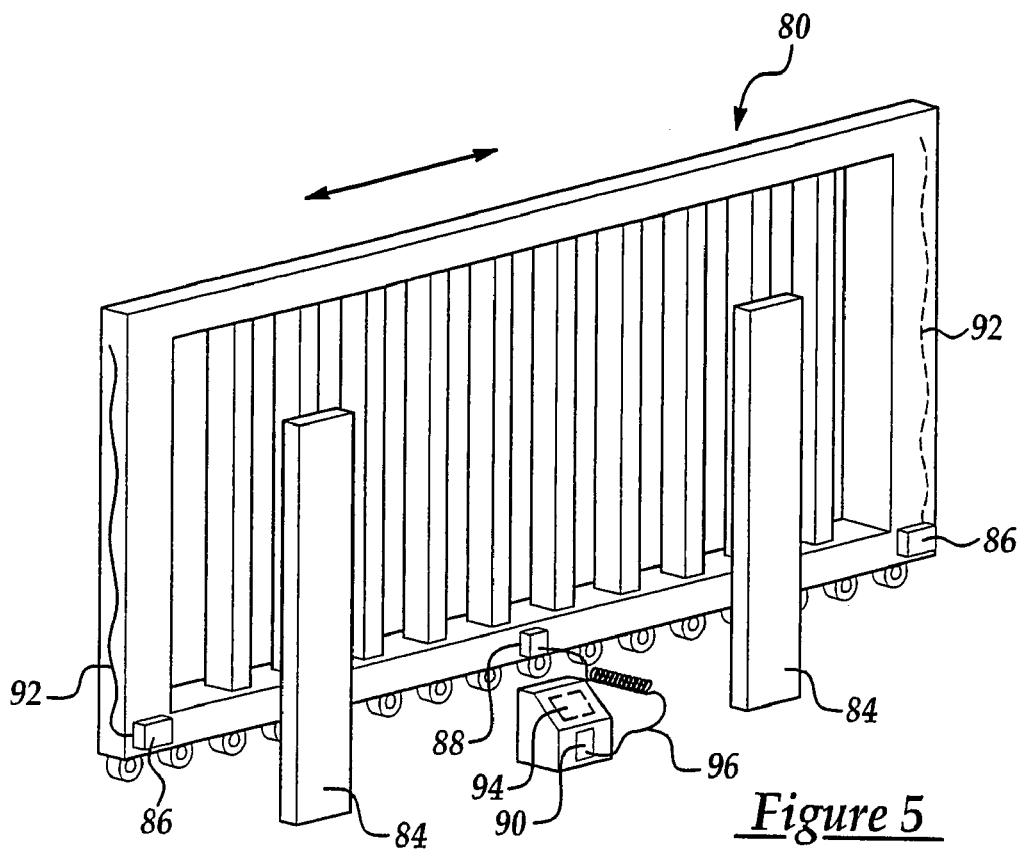
FIG. 5 is a perspective view of a slide gate having a modular capacitive presence sensing system which is hard-wired in accordance with invention.
Figure 6:
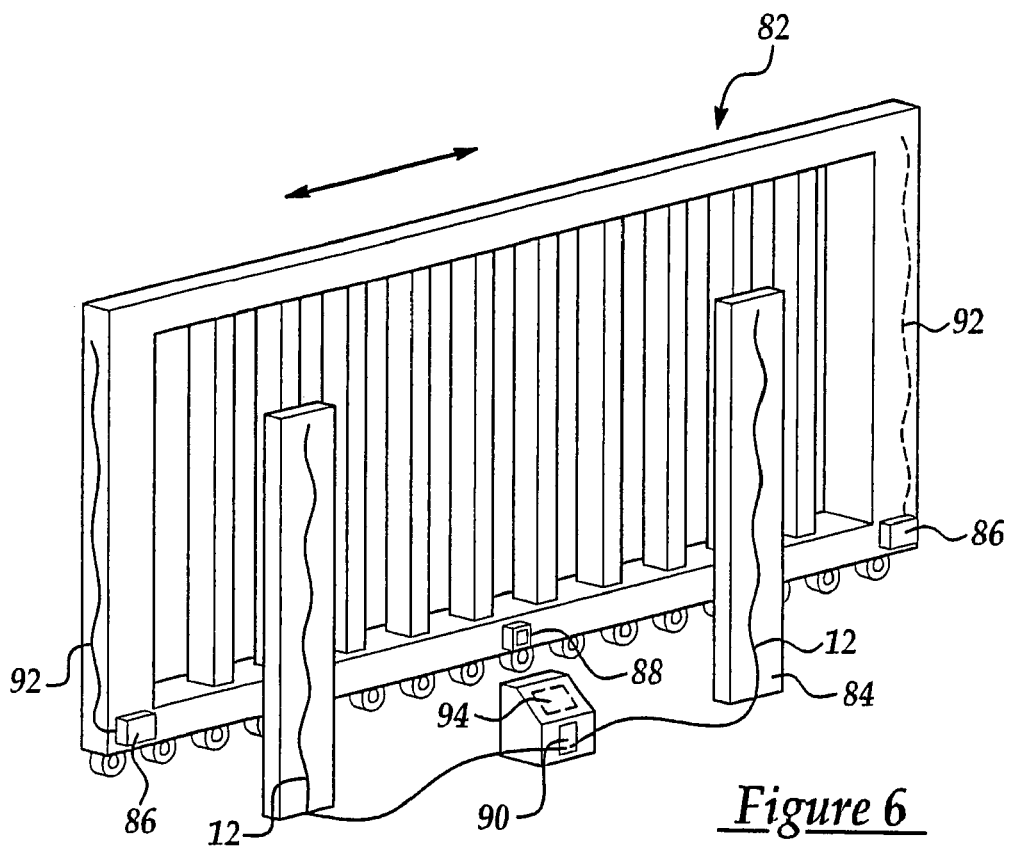
FIG. 6 is a perspective view of a slide gate with capacitive presence system utilizing RF transmit signals in accordance with the invention.

As shown in FIGS. 5–9, an improved modular presence detection system 100 is adapted for use with a slide gate system 80. The modular system permits use of components that permit the system to be easily adapted for a large number of applications. The modular system 100 may be used with any presence sensing application. The slide gate system 80 has a gate 82 which is moved reciprocally between pairs of protection posts 84 by a drive unit 102 (not shown) and controller 94. The modular units include an RS box 86, a com box 88 and a receiver box 90. Each sensor 92 is connected to one RS box 86 which is mounted near one end of the sensor. In the system 80 shown in FIG. 6, each end of the gate 82 and the posts 84 are provided with a sensor 92 and RS box 86. The RS box 86 includes the oscillator and fail-safe circuit. The com box 88 is mounted to the gate 82 and receives a signal from the RS box 86 and. sensor 92. The RS box 86 produces signals which are delivered to the receiver box 90 located in or adjacent to a structure system controller 94. The receiver box 90 receives the signals by wire 96 as shown in FIG. 5 or by a radio frequency transmitter installed in the com box 88 as shown in FIG. 6. The com box 88 delivers a signal such as "stop", "stop and reverse" or "fail safe". The controller 94 then directs the drive unit to the appropriate action.

Figure 7:
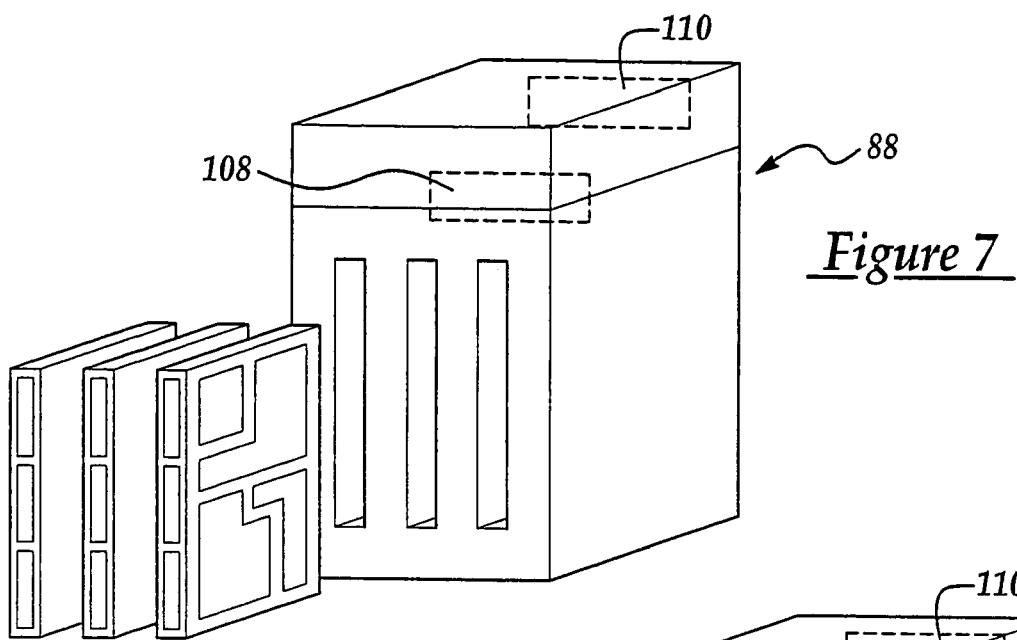
FIG. 7 is a perspective rear view of a combox having three cards.
Figure 8:
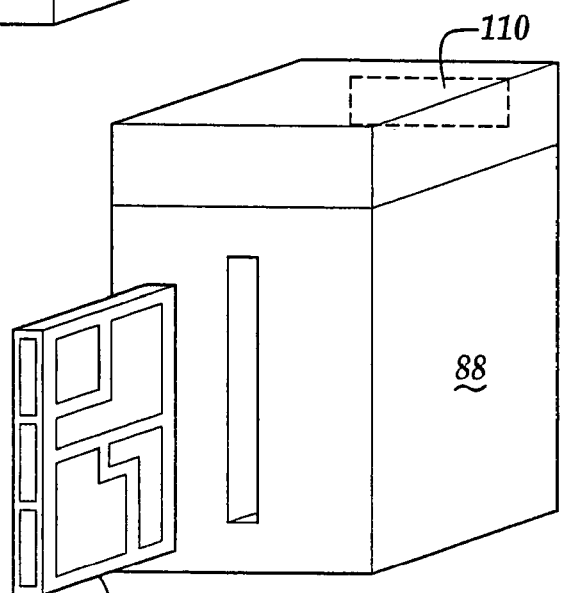
FIG. 8 is a perspective rear view of a combox adapted for use with one card.
Figure 9:
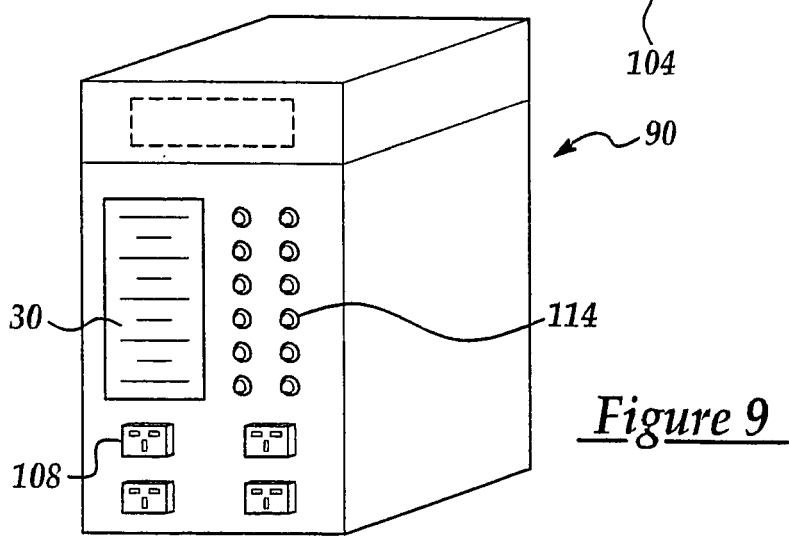
FIG. 9 is a front view of a receiver box showing switches and warning lights and plugs in accordance with the invention.

The com box 88 contains from one to three cards, three cards shown in FIG. 7 or one card as shown in FIG. 8. The cards may be either a RSC card 104 and a radio transmitter card 106. The com box 88 includes a power source, such as a lithium battery and may include a solar cell or other charging means to charge the battery. One RSC card 104 is necessary for each capacitive sensor 12 and RS box. The RSC includes the electronic circuitry necessary to produce an error signal or fail-safe signal. The com box 88 includes both a bus 108 and a port 110. The bus 108 permits two-way connection of all cards in the com box 88. The com box 88 may contain one to three RSC cards 104. Alternatively, the com box 88 may contain one or two RSC cards 104 and one radio transmitter card 106.

The radio transmitter card 106 is connected to the power source and transmits signals received from any of the RSC cards 104 to the receiver box 90. The radio transmitter card 106 permits the com box 88 to be used on moving structures such as slide gates or in remote locations. Some applications could require four or more sensors mounted to a particular structure. Each sensor 92 is connected to the corresponding RSC card 104 in the com box 88. In some applications, one or more of the RSCs in a com box may be connected through the ports to other communication devices such as a telephone transmitter, equipment controller or alarm system.

The receiver box 90 includes a power source, a relay system and slots to receive either the RSC card 104 or a radio receiver card 106. The receiver box 90 is typically located in the control box for the mechanism such as a parking gate, slide gate, or door opener. However, can be used in security system or other applications. The radio receiver card is tuned to receive signals broadcast by the radio transmitter card 106 in the com box 88. The signals are either error signals or fail-safe signals. The signals are delivered to a relay which diverts the appropriate signal to the logic system of the apparatus. Error signals are converted to logical signals such as stop, stop and reverse, or reverse which are then delivered to the equipment controller.

The receiver box 90 also contains lights 114 for monitoring the condition of the system. The receiver box 90 also contains switches (not shown) for selecting the receive frequency as discussed above. Finally, the box has connections to an RS box, a com box, or a control box 94 to deliver and receive the appropriate signal.

The invention claimed is:

1. A capacitive presence sensing system comprising:
   a sensor;
   an oscillator having a output connected to said sensor;
   said presence sensing system having a fail-safe device, said device comprising:
   a substantially constant DC voltage source connected by an electrical circuit through said sensor; and
   signaling means connected to said voltage source, said signaling means operable to generate a signal when said electrical circuit is open.

2. The capacitive presence sensing system of claim 1 wherein said signaling means further comprises an oscillator, said oscillator responsive to a change in voltage defined by said electrical circuit to change a frequency of a signal generated by said oscillator.

3. The capacitive presence sensing system of claim 1 wherein said electrical circuit further comprises a coaxial cable having a center wire and a shield, said center wire being connected to said voltage source and said shield being connected to said signaling means.

* * * * *